United States Patent [19]

Shamsoum et al.

[11] Patent Number: 5,254,517
[45] Date of Patent: Oct. 19, 1993

[54] DIETHYLALUMINUM ALKOXIDE/ALUMINUM ALKYL CO-CATALYST FOR IMPROVED POLYMERIZATION YIELD

[75] Inventors: Edwar S. Shamsoum, Houston; David J. Rauscher, Webster; Shabbir Malbari, Pasadena, all of Tex.

[73] Assignee: Fina Technology, Inc., Dallas, Tex.

[21] Appl. No.: 776,498

[22] Filed: Oct. 11, 1991

[51] Int. Cl.$^5$ .............................................. C08F 4/642
[52] U.S. Cl. .................................... 502/110; 502/103; 502/117; 502/125; 526/153
[58] Field of Search ................ 502/103, 110, 125, 117

[56] References Cited

U.S. PATENT DOCUMENTS

| | | | |
|---|---|---|---|
| 3,784,539 | 1/1974 | Ort | 502/110 X |
| 4,399,055 | 8/1983 | Matsuura et al. | 502/125 |
| 4,985,515 | 1/1991 | Matsuura et al. | 502/108 X |

*Primary Examiner*—Patrick P. Garvin
*Attorney, Agent, or Firm*—M. Norwood Cheairs; Jim D. Wheelington

[57] ABSTRACT

This invention relates to a catalyst system using a diethylaluminum alkoxide-aluminum alkyl cocatalyst and to a process for polymerization of olefins using the catalyst system. Use of this catalyst system increases polymerization yield. The diethylaluminum alkoxide is preferably diethylaluminum ethoxide and the aluminum alkyl is preferably triethyl aluminum. The mole-to-mole ratio of diethylaluminum alkoxide to aluminum alkyl ranges from 0.05 to 0.2. This invention is effective for the aluminum/transition metal ratio for the polymerization of olefins ranges from about 100 to about 500. Polymerization yield increases of greater than 10% are realized.

31 Claims, 1 Drawing Sheet

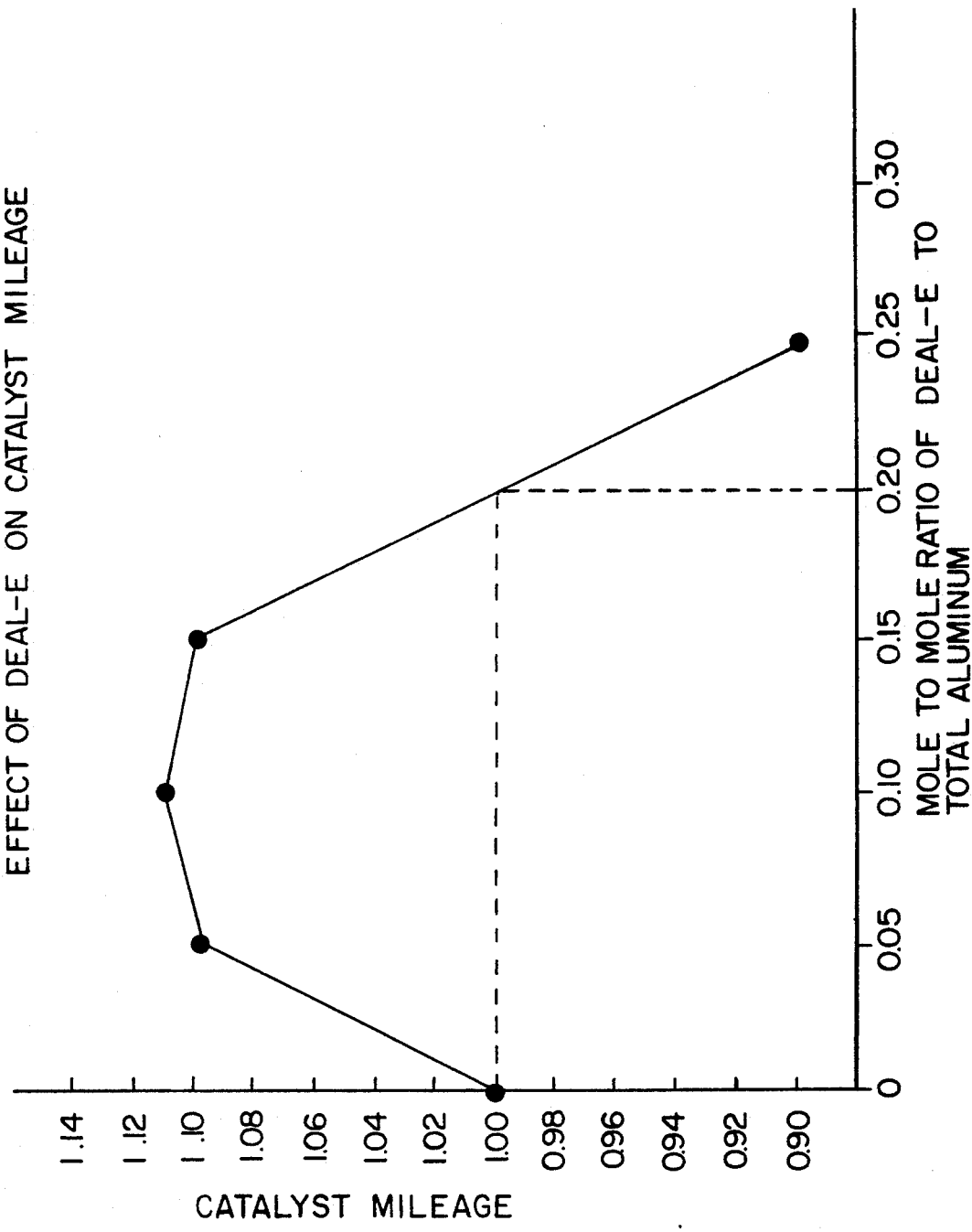

DIETHYLALUMINUM ALKOXIDE/ALUMINUM ALKYL CO-CATALYST FOR IMPROVED POLYMERIZATION YIELD

BACKGROUND OF THE INVENTION

1. Field of the Invention

This invention relates to a catalyst system, a process for making the catalyst system and a process for olefin polymerization using the catalyst system. More specifically, this invention relates to a catalyst system using a diethylaluminum alkoxide, such as diethylaluminum ethoxide, with an aluminum alkyl, such as triethylaluminum, as a cocatalyst, to a process for making the catalyst system and to a polymerization of olefins, specifically propylene, using the catalyst system which increases polymerization yield.

2. Description of the Prior Art

Diethylaluminum ethoxide (DEAl-E) is known as a co-catalyst. U.S. Pat. No. 4,335,016 discloses a new catalyst activated with a cocatalyst of an organometallic compound or hydrogen or mixtures thereof, such as alkyl lithium, alkyl magnesium, alkyl aluminum, alkyl aluminum halide or alkyl zinc. Diethylaluminum ethoxide is listed as an example of a cocatalyst but the working examples of the patent used triisobutylaluminum as the cocatalyst. There is no disclosure that a mixture of DEAl-E with any other cocatalyst would result in an increase in polymerization yield.

U.S. Pat. No. 4,985,515 discloses a combination of triethyl aluminum (TEAl) and diethylaluminum ethoxide (DEAl-E) as a co-catalyst for catalyst for the polymerization of olefins. Several other combinations of organoaluminum compounds as co-catalysts are also disclosed without showing any superior results of one combination over the others.

U.S. Pat. No. 4,399,055 discloses a combination of triethylaluminum, diethylaluminum ethoxide and diethylaluminum chloride (DEAC). Other combinations are also disclosed including triethylaluminum and diethylaluminum ethoxide but no comparison of the effect of using different combinations of co-catalyst on polymerization yield is reported. The working examples reported use the TEAl/DEAl-E/DEAC combination.

The patents above and others of the prior are concerned with the ratio of co-catalyst to Ziegler-Natta type catalyst component rather than a mixture of co-catalysts which affects polymerization yield. It would be advantageous to provide a mixture of co-catalysts which would improve polymerization yield.

SUMMARY OF THE INVENTION

Accordingly, an object of this invention is to provide a mixture of co-catalysts to improve polymerization yield.

And, an object of this invention is to provide a catalyst system which reduces cost by increasing catalyst mileage.

Also, an object of this invention is to provide a catalyst system which decreases the residual catalyst content (ash) of the polymer.

These and other objects are accomplished by a Ziegler-Natta catalyst system which comprises:

a) a transition metal compound of the general formula $MR_x$ where M is a Group IVB, VB or VIB metal, R is a halogen or a hydrocarbyloxy and x is the valence of the metal;

b) an aluminum alkyl of the general formula $AlR'_3$ where R' is an alkyl of from 1–8 carbon atoms and R' may be the same or different; and c) diethylaluminum alkoxide where the alkoxide has 1–4 carbon atoms;

wherein the mole-to-mole ratio of diethylaluminum alkoxide to aluminum alkyl ranges from 0.05 to 0.2.

BRIEF DESCRIPTION OF THE DRAWINGS

A more complete appreciation of the invention and many of the attendant advantages thereof will be readily understood by reference to the following detailed description when considered in connection with the accompanying drawings in which like numerals in different figures represent the same structures or elements wherein:

FIG. 1 is a graph of DEAl-E/Al molar ratio versus catalyst mileage.

DETAILED DESCRIPTION OF THE INVENTION

This invention is useful for polymerization utilizing any Ziegler-Natta type catalyst. The catalyst is generally composed of a transition metal compound and an aluminum alkyl. Optionally, an electron donor may be added. The transition metal compound is preferably of the general formula $MR_x$ where M is the metal, R is a halogen or a hydrocarbyloxy and x is the valence of the metal. Preferably, M is a Group IVB, VB or VIB metal, more preferably a Group IVB, and most preferably titanium. Preferably, R is chlorine, bromine, an alkoxy or a phenoxy, more preferably chlorine or ethoxy and most preferably, chlorine. Illustrative examples of the transition metal compound catalyst components are $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present.

The aluminum alkyl is of the general formula $AlR'_3$ where R' is an alkyl of from 1–8 carbon atoms and R' may be the same or different. Examples of aluminum alkyls are trimethyl aluminum (TMA), triethyl aluminum (TEAl) and triisobutyl aluminum (TiBAl). The preferred aluminum alkyl is TEAl. Furthermore, combinations of aluminum alkyls are effective.

Typically, an electron donor is an organosilicon compound. Examples of electron donors are cyclohexylmethyl dimethoxysilane (CMDS) diphenyldimethoxy silane (DPMS) and isobutyltrimethoxy silane (IBMS). Other examples of electron donors are disclosed in U.S. Pat. Nos. 4,218,339; 4,395,360; 4,328,122; 4,473,660; 4,562,173 and 4,547,552, which are hereby incorporated by reference.

One method to us the catalyst system of this invention is to mix the aluminum alkyl with a Ziegler-Natta type catalyst. An electron donor may be optionally added. The diethyl aluminum alkoxide is mixed with an olefin. The catalyst/aluminum alkyl/electron donor is added to the olefin/diethylaluminum alkoxide and brought to polymerization conditions. Another method is to mix the diethylaluminum alkoxide with the aluminum alkyl, add diethylaluminum alkoxide/aluminum alkyl mixture to a Ziegler-Natta type catalyst and, optionally, an electron donor. This mixture is then mixed with an olefin and brought to polymerization conditions. The diethylaluminum alkoxide and aluminum alkyl are present such that the mole-to-mole ratio of diethylaluminum alkoxide to aluminum alkyl ranges from 0.05 to 0.2.

The diethylaluminum alkoxide is preferably diethylaluminum methoxide, diethylaluminum ethoxide, diethylaluminum propoxide or diethylaluminum butoxide, and, most preferably, diethylaluminum ethoxide (DEAL-E).

Without limiting the scope of the claims, the mechanism of the diethylaluminum alkoxide in increasing polymerization yield is believed to be that an aluminum alkoxide, such as diethylaluminum ethoxide, interacts with the transition metal and converts inactive sites to sites active for olefin polymerization. It is believed that the oxygen in the diethylaluminum alkoxide bonds with the transition metal and the subsequent reduction of the transition metal by alkyl aluminum transforms an inactive transition metal site to an active one. Activating these sites results in an increased yield of stereoregular or crystalline polymer.

The catalyst system is useful in the polymerization of olefins, preferably α-olefins and, most preferably, propylene. Polymerization is effected by making the catalyst system and bringing it in contact with the olefin monomer in a reaction zone under polymerization conditions.

tor with 0.4 liter of propylene. Polymerization continued for one hour during which time the reactor was maintained at the polymerization temperature (60° C.). At the end of this time polymerization was terminated by rapidly venting the reactor of unreacted monomer. The polymer yield and catalyst mileage are shown in Table I.

EXAMPLE 3

The procedure of Example 2 was followed except that 1.8 mmol of TEAl and 0.2 mmol of DEAl-E were used. The polymer yield and catalyst mileage are shown in Table I.

EXAMPLE 4

The procedure of Example 2 was followed except that 1.7 mmol of TEAl and 0.3 mmol of DEAl-E were used. The polymer yield and catalyst mileage are shown in Table I.

EXAMPLE 5

The procedure of Example 2 was followed except that 1.5 mmol of TEAl and 0.5 mmol of DEAl-E were used. The polymer yield and catalyst mileage are shown in Table I.

TABLE I

| EXAMPLE | TEAL (MMOLES) | DEAl-E (MMOLES) | DEAl-E/Al RATIO | Al/Ti RATIO | POLYMERIZATION YIELD (GMS) | CATALYST MILEAGE | CATALYST EFFICIENCY (GM/GM-HR) |
|---|---|---|---|---|---|---|---|
| 1 | 2.0 | — | 0.0 | 400 | 164 | 1.00 | 16,400 |
| 2 | 1.9 | 0.1 | 0.05 | 400 | 180 | 1.10 | 18,000 |
| 3 | 1.8 | 0.2 | 0.10 | 400 | 182 | 1.11 | 18,200 |
| 4 | 1.7 | 0.3 | 0.15 | 400 | 180 | 1.10 | 18,000 |
| 5 | 1.5 | 0.5 | 0.25 | 400 | 148 | 0.90 | 14,800 |

Prepolymerization of the catalyst system can be achieved by contacting the transition metal compound with a small amount of the aluminum alkyl and an olefin monomer prior to introduction to the reaction zone at a temperature below that of the polymerization conditions.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

2.0 mmol of TEAl were placed in a stainless steel bomb with 10 mg of Ziegler-Natta catalyst and 0.02 mmol of CMDS. 1.0 liter of propylene was placed in a 2 liter Zipperclave reactor at 60° C. Contents of the bomb were charged to the reactor with 0.4 liter of propylene. Polymerization continued for one hour during which time the reactor was maintained at the polymerization temperature (60° C.). At the end of this time polymerization was terminated by rapidly venting the reactor of unreacted monomer. The polymer yield and catalyst mileage are shown in Table I.

EXAMPLE 2

1.9 mmol of TEAl and 0.1 mmol of DEAl-E were placed in a stainless steel bomb with 10 mg of Ziegler-Natta catalyst and 0.02 mmol of CMDS. 1.0 liter of propylene was placed in a 2 liter Zipperclave reactor at 60° C. Contents of the bomb were charged to the reac- The results of Examples 1-5 are shown in FIG. 1 as the mole-to-mole ratio of DEAl-E to Al versus catalyst mileage. Catalyst mileage is obtained by dividing the polymer yield of any example by the polymer yield for the example which did not use DEAL-E (Example 1). This would mean that Example 1 would have a catalyst mileage of 1.00 and the others would be greater or less than 1.00 depending on whether the polymer yield is greater or less than the polymer yield for Example 1. Catalyst mileage is a convenient method to express a better or worse case than a base case.

This data shows that when the DEAl-E/Al ratio is as small as about 0.05 polymerization yield is increased by using a DEAl-E/TEAl co-catalyst instead of TEAl alone. Preferably, the DEAL-E/Al ratio ranges from about 0.05 to about 0.20 and, most preferably, is 0.10.

It is believed that a mole-to-mole ratio of diethylaluminum alkoxide to total aluminum from about 0.05 to about 0.20 would result in an increase in polymerization yield for any aluminum/transition metal ratio commonly used for the polymerization of olefins. Typically, the aluminum/transition metal ratio for the polymerization of olefins ranges from about 100 to about 500. Preferably, the alkyl aluminum/transition metal ratios for the present invention is 350–450 and, most preferably, is 400. Preferably, the mole-to-mole ratio of diethylaluminum alkoxide to total aluminum is 0.10.

Obviously, numerous modifications and variations of the present invention are possible in light of the above teachings. It is therefore to be understood that within the scope of the appended claims, the invention may be practiced otherwise than as specifically described herein.

We claim:

1. A Ziegler-Natta catalyst system useful for the polymerization of olefins comprising:
   a) a transition metal compound of the general formula $MR_x$ where M is a Group IVB, VB or VIB metal, R is a halogen or a hydrocarbyloxy and x is the valence of the metal;
   b) an aluminum alkyl of the general formula $AlR'_3$ where R' is an alkyl of from 1-8 carbon atoms and R' may be the same or different; and
   c) diethylaluminum alkoxide where the alkoxide has from 1-4 carbon atoms;
   wherein the mole-to-mole ratio of diethylaluminum alkoxide to total aluminum ranges from about 0.5 to about 0.20;
   wherein the mole-to-mole ratio of total aluminum to transition metal ranges from about 100 to about 500.

2. A catalyst system as recited in claim 1 wherein the catalyst system additionally comprises an organosilicon compound as an electron donor.

3. A catalyst system as recited in claim 2 wherein the electron donor is cyclohexylmethyldimethoxysilane, diphenyldimethoxy silane or isobutyltrimethoxy silane.

4. A catalyst system as recited in claim 3 wherein the electron donor is cyclohexyl methyldimethoxysilane.

5. A catalyst system as recited in claim 1 wherein M is a Group IVB metal.

6. A catalyst system as recited in claim 5 wherein M is titanium.

7. A catalyst system as recited in claim 1 wherein R is chlorine, bromine, an alkoxy or a phenoxy.

8. A catalyst system as recited in claim 7 wherein R is chlorine or ethoxy.

9. A catalyst system as recited in claim 8 wherein R is chlorine.

10. A catalyst system as recited in claim 1 wherein $MR_x$ is $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_2H_5)_2Br_2$, $Ti(OC_{12}H_{25})Cl_3$ or mixtures thereof.

11. A catalyst system as recited in claim 1 wherein the aluminum alkyl is trimethyl aluminum, triethyl aluminum, triisobutyl aluminum or combinations thereof.

12. A catalyst system as recited in claim 11 wherein the aluminum alkyl is triethyl aluminum.

13. A catalyst system as recited in claim 1 wherein the diethyl aluminum alkoxide is diethylaluminum ethoxide.

14. A catalyst system as recited in claim 1 wherein the mole-to-mole ratio of total aluminum to transition metal ranges from about 350 to about 450.

15. A catalyst system as recited in claim 14 wherein the mole-to-mole ratio of total aluminum to transition metal is about 400.

16. A catalyst system as recited in claim 1 wherein the mole-to-mole ratio of diethylaluminum alkoxide to total aluminum is about 0.10.

17. A process for making a catalyst system comprising:
   a) mixing an aluminum alkyl of the general formula $AlR'_3$ where R' is an alkyl of from 1-8 carbon atoms and R' may be the same or different with diethylaluminum alkoxide; and
   b) adding the diethylaluminum alkoxide/aluminum alkyl mixture to a Ziegler-Natta type catalyst having a transition metal compound of the general formula $MR_x$ where M is a Group IVB, VB or VIB metal, R is a halogen or a hydrocarbyloxy and x is the valence of the metal;
   wherein the mole-to-mole ratio of diethylaluminum alkoxide to total aluminum ranges from about 0.5 to about 0.20;
   wherein the mole-to-mole ratio of total aluminum to transition metal ranges from about 100 to about 500.

18. A process as recited in claim 17 wherein the process additionally comprises adding an organosilicon compound as an electron donor.

19. A process as recited in claim 18 wherein the electron donor is cyclohexylmethyl dimethyoxysilane, diphenyldimethoxy silane or disobutyltrimethoxy silane.

20. A process as recited in claim 17 wherein M is a Group IVB metal.

21. A process as recited in claim 20 wherein M is titanium.

22. A process as recited in claim 17 wherein R is chlorine, bromine, an alkoxy or a phenoxy.

23. A process as recited in claim 22 wherein R is chlorine or ethoxy.

24. A process as recited in claim 23 wherein R is chlorine.

25. A process as recited in claim 17 wherein $MR_x$ is $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_2H_5)_2Br_2$, $Ti(OC_{12}H_{25})Cl_3$ or mixtures thereof.

26. A process as recited in claim 17 wherein the aluminum alkyl is trimethyl aluminum, triethyl aluminum, triisobutyl aluminum or combinations thereof.

27. A process as recited in claim 26 wherein the aluminum alkyl is triethyl aluminum.

28. A process as recited in claim 17 wherein the diethylaluminum alkoxide is diethylaluminum ethoxide.

29. A process as recited in claim 17 wherein the mole-to-mole ratio of total aluminum to transition metal ranges from about 350 to about 450.

30. A process as recited in claim 29 wherein the mole-to-mole ratio of total aluminum to transition metal is about 400.

31. A process as recited in claim 17 wherein the mole-to-mole ratio of diethylaluminum alkoxide to total aluminum is about 0.10.

* * * * *